US012724675B2

(12) United States Patent
Dangi et al.

(10) Patent No.: US 12,724,675 B2
(45) Date of Patent: Sep. 1, 2026

(54) DATA BACKUP SYSTEM USING BOTH A DATA BACKUP SERVER OPERATING IN A NON-RETENTION LOCKED MODE AND A DATA BACKUP SERVER OPERATING IN RETENTION LOCKED MODE

(71) Applicant: Dell Products L.P., Round Rock, TX (US)

(72) Inventors: Salil Dangi, Mission Viejo, CA (US); Amol Powar, Burlington (CA)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/353,220

(22) Filed: Jul. 17, 2023

(65) Prior Publication Data

US 2025/0028606 A1 Jan. 23, 2025

(51) Int. Cl.
*G06F 11/1446* (2026.01)
*G06F 16/11* (2019.01)

(52) U.S. Cl.
CPC ...... *G06F 11/1464* (2013.01); *G06F 11/1453* (2013.01); *G06F 16/125* (2019.01)

(58) Field of Classification Search
CPC ......................... G06F 11/1464; G06F 11/1453
See application file for complete search history.

(56) References Cited

U.S. PATENT DOCUMENTS

| | | | | |
|---|---|---|---|---|
| 5,202,982 | A | 4/1993 | Gramlich et al. | |
| 5,893,140 | A | 4/1999 | Vahalia et al. | |
| 11,341,245 | B1 * | 5/2022 | Voss | G06F 11/2094 |
| 12,032,456 | B1 | 7/2024 | Dangi et al. | |
| 2009/0240739 | A1 | 9/2009 | Bhatt et al. | |
| 2013/0066835 | A1 | 3/2013 | Haubold et al. | |
| 2021/0149768 | A1 | 5/2021 | Moon et al. | |
| 2022/0083514 | A1 * | 3/2022 | Rath | G06F 16/1774 |
| 2022/0114062 | A1 * | 4/2022 | Madan | G06F 11/1469 |
| 2024/0330128 | A1 | 10/2024 | Dangi et al. | |

* cited by examiner

*Primary Examiner* — Eric T Loonan
(74) *Attorney, Agent, or Firm* — Workman Nydegger

(57) ABSTRACT

One example method includes adding a retention locked (RL) mode compliant replication component to a first data backup server that is configured to operate in a non-RL mode. The retention locked mode compliant replication component causes backup data files that are stored in a non-RL mode on a backup storage server to be virtually copied to backup data files that are stored in a RL mode on the backup storage server. The backup data files are for backup server clients that are configured to operate in the non-RL mode. The retention locked mode compliant replication component causes control of the backup data files stored in the RL mode to be given to a second data backup server that is configured to operate in the RL compliant mode.

15 Claims, 10 Drawing Sheets

600

Adding A Retention Locked (RL) Mode Compliant Replication Component To A First Data Backup Server That Is Configured To Operate In A Non-RL Mode — 610

Causing, By The Retention Mode Compliant Replication Component, A Plurality Of Backup Data Files That Are Stored In A Non-RL Mode On A Backup Storage Server To Be Virtually Copied To A Plurality Of Backup Data Files That Are Stored In A RL Mode On The Backup Storage Server, The Plurality Of Backup Data Files Being For A Plurality Of Backup Server Clients That Are Configured To Operate In The Non-RL Mode — 620

Causing, By The Retention Mode Compliant Replication Component, Control Of The Plurality Of Backup Data Files Stored In The RL Mode To Be Given To A Second Data Backup Server That Is Configured To Operate In The RL Compliant Mode — 630

FIG. 7

DATA BACKUP SYSTEM USING BOTH A DATA BACKUP SERVER OPERATING IN A NON-RETENTION LOCKED MODE AND A DATA BACKUP SERVER OPERATING IN RETENTION LOCKED MODE

FIELD OF THE INVENTION

Embodiments of the present invention generally relate to data backup and restore processes. More particularly, at least some embodiments of the invention relate to systems, hardware, software, computer-readable media, and methods for performing the backup and restore processes in a system that includes some elements operating in a non-retention locked mode and other elements operating in a retention locked (RL) mode.

BACKGROUND

Backup and restore systems typically include various elements such as a backup server, a client server, and a storage server. All three of these elements work together to backup data and then to restore the data when there has been an event that requires the backed up data to be restored.

In recent years, users of the backup and restore systems have required that the one or more of the backup server, the client server, and the storage server provide enhanced retention measures to ensure that any backed up data is sufficiently secured so that it may not be lost, either through a malicious action or through user error. As these enhanced retention measures have been introduced, it has created problems for the ensuring that the backup server, the client server, and the storage server are still able to operate together as one or more of these elements may not be easily configured to implement the enhanced retention measures.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 7 illustrates an example computing system in which the embodiments described herein may be employed.

DETAILED DESCRIPTION OF SOME EXAMPLE EMBODIMENTS

Figure 1:
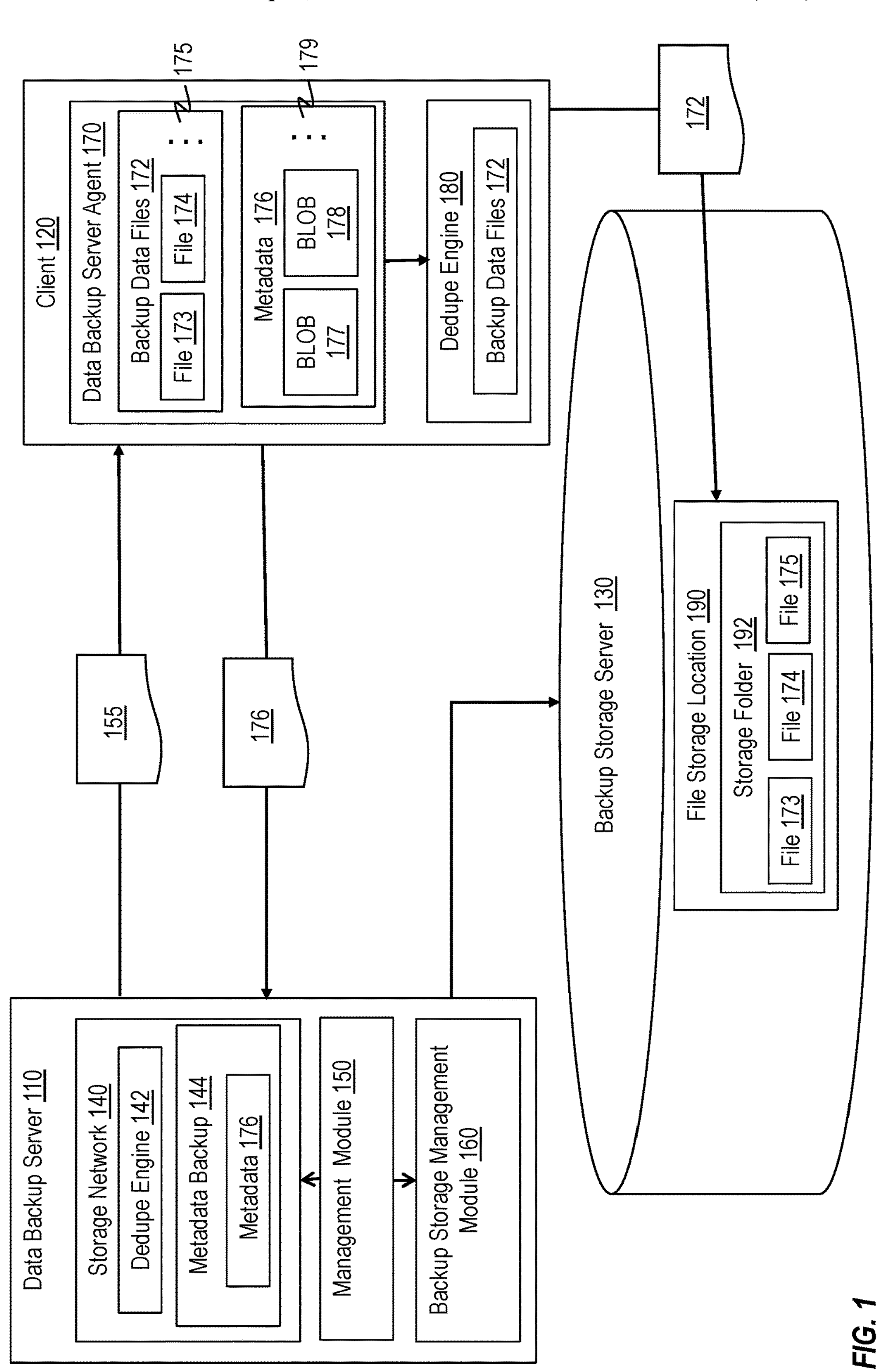
FIG. 1 illustrates an embodiment of backup computing system according to embodiments disclosed herein.

Embodiments of the present invention generally relate to data backup and restore processes. More particularly, at least some embodiments of the invention relate to systems, hardware, software, computer-readable media, and methods for performing the backup and restore processes in a system that includes some elements operating in a non-retention locked mode and other elements operating in a retention locked mode.

One example method includes adding a retention locked (RL) mode compliant replication component to a first data backup server that is configured to operate in a non-RL mode. The retention locked mode compliant replication component causes backup data files that are stored in a non-RL mode on a backup storage server to be virtually copied to backup data files that are stored in a RL mode on the backup storage server. The backup data files are for backup server clients that are configured to operate in the non-RL mode. The retention locked mode compliant replication component causes control of the backup data files stored in the RL mode to be given to a second data backup server that is configured to operate in the RL compliant mode.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented A. Aspects of an Example Architecture and Environment The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, an embodiment of a backup computing system 100 for performing data backups and the like is denoted generally at 100. The backup computing system 100 includes a data backup server 110, a client 120, and a backup storage server 130. The data backup server 110 may be implemented as a single computing system or it may be distributed across multiple computing systems, which may be physical computing systems and/or virtual computing systems. The data backup server 110 is configured to provide backup storage and backup management capabilities. Accordingly, the data backup server 110 includes a storage network 140 for storing backup data such as metadata backup files and other data backup files. The storage network 140 may include a deduplication ("dedupe") engine 142 that dedupes the data before it is stored on the storage network 140. In addition, the data backup server 110 includes a management module 150 that provides management services for the backup system 100 and also includes an interface for receiving user input. A backup storage management module 160 provides management services to the backup storage server 130 and allows the data server 110 to communicate with the backup storage server 130. The data backup server 110 may include further components that are not illustrated in FIG. 1. In one embodiment, the data backup server 110 may be the Dell-EMC Avamar platform.

The client 120 may be implemented as a backup server that prepares data and its associated metadata that needs to be backed up and then writes the backup data and the metadata to the data backup server 110 and/or backup storage server 130. Although only one client 120 is illustrated for ease of explanation, in operation there will typically be a large number of clients 120 that are included in the backup computing system 100 and that will function in a similar manner as the client illustrated client 120.

The client 120 may host a data backup server agent 170, which may be an agent of the data backup server 110. The data backup server agent 170 may be implemented as a plugin that is invoked by the client 120 as needed for performing data backups. The client 120 may also host a dedupe engine 180, which may be an API associated with the backup storage server 130. The dedupe engine 180 may dedupe the backup data. Since the dedupe engine 180 is an API associated with the backup storage server 130, it may also be used by the data backup server agent 170 to write the deduped backup data to the backup storage server 130 and to otherwise interact with the backup storage server 130.

The backup storage server 130 is the target storage for the backup data from the client 120 and thus includes the physical storage where the backup data is stored. The backup storage server 130 may include its own dedupe engine (not illustrated) that can dedupe backup data as needed before the data is stored. The backup storage server 130 may also provide additional storage services as needed. In one embodiment, the backup storage server 130 may be the Dell-EMC DataDomain storage environment.

An embodiment of the operation of the computing system 100 will now be explained in relation to FIG. 1. It will be appreciated that the order that the operations are described is for ease of explanation only. Thus, the operations may take place in a different order as circumstances warrant. The management module 150 generates a backup work order 155 that specifies data that the client 120 should backup. The backup work order 155 is then sent to the client 120. Upon receipt of the backup work order 155, the client 120 may invoke the data backup server agent 170 for use in performing the data backup.

The data backup server agent 170 prepares backup data files 172 that need to be backed up. As illustrated, the backup data files 172 includes various data files for backup. For example, the backup data files 172 includes a backup file 173, a backup file 174, and any number of additional backup files 175 as illustrated by the ellipses.

The data backup server agent 170 also prepares metadata 176 that is associated with all the backup data files 172 and includes information about all the backup data files 172 such as file name, directory information, and other attributes of each backup file. Thus, the metadata 176 will include a metadata Binary Large Object (BLOB) 177 (metadata of backup data file 173), a metadata BLOB 178 (metadata of backup data file 174), and any number of additional metadata BLOBs 179 (metadata of any additional backup data files 175) as illustrated by the ellipses. It will be appreciated that although only a small number of backup files and metadata BLOBs are shown in FIG. 1, this is for ease of illustration only as in typical embodiment there may be millions or even tens of millions of backup files and metadata prepared by the data backup server agent 170.

The data backup server agent 170 provides the backup data files 172 to the dedupe engine 180, which performs a dedupe operation on the backup data files 172 as needed. The data backup server agent 170 then uses an API call from the dedupe engine 180 to send the deduped backup data files 172 to the backup storage server 130. In some embodiments, the data backup server agent 170 provides progress and status information to the data backup server 110.

Upon receipt at the backup storage server 130, the backup data files 173, 174, and 175 are written by the data backup server agent 170 into a storage folder 192 inside a storage location 190 of the backup storage server 130. Accordingly, the storage folder 192 will not be changed or modified and will only be read from if a restore operation is ever needed.

It will be noted that in the disclosed embodiments, a one-to-one relationship is shown between the backup data files 173, 174, and 175 of the data files 172 that are generated by the data backup server agent 170 and those that are written into the storage folder 192. However, this is for ease of illustration only and the one-to-one relationship need not be the case. For example, in some embodiments the number of backup data files generated by the data backup server agent 170 may be much larger than the number of backup data files written to the temporary folder. For instance, there may be 50 million backup data files 172 at the client 120, but only 500K backup data files 172 are written to the temporary folder since the data backup server agent 170 may use packing to pack more than one backup data file from the backup data files 172. The packing results in a lesser number, but larger in size, of backup data files being written to the storage folder 192. Thus, the embodiments and claims disclosed herein are not limited to any number of backup data files 172 written to the storage folder 192 or to any relationship between the number of backup data files are generated at the client 120 and the number that are written to the storage folder 192.

The data backup server agent 170 also connects with the storage network 140 and sends the metadata 176 to the storage network 140. The storage network 140 then stores the metadata 176 including the metadata BLOB 177 and the metadata BLOB 178 in a metadata backup 144. Although not illustrated, the additional metadata BLOBs 179 may also be stored in the metadata backup 144. The backup entry is then sealed on the storage network 140 and is ready for any future restoration process or other related processes.

B. Aspects of Some Example Embodiments of the Invention

Figure 2:
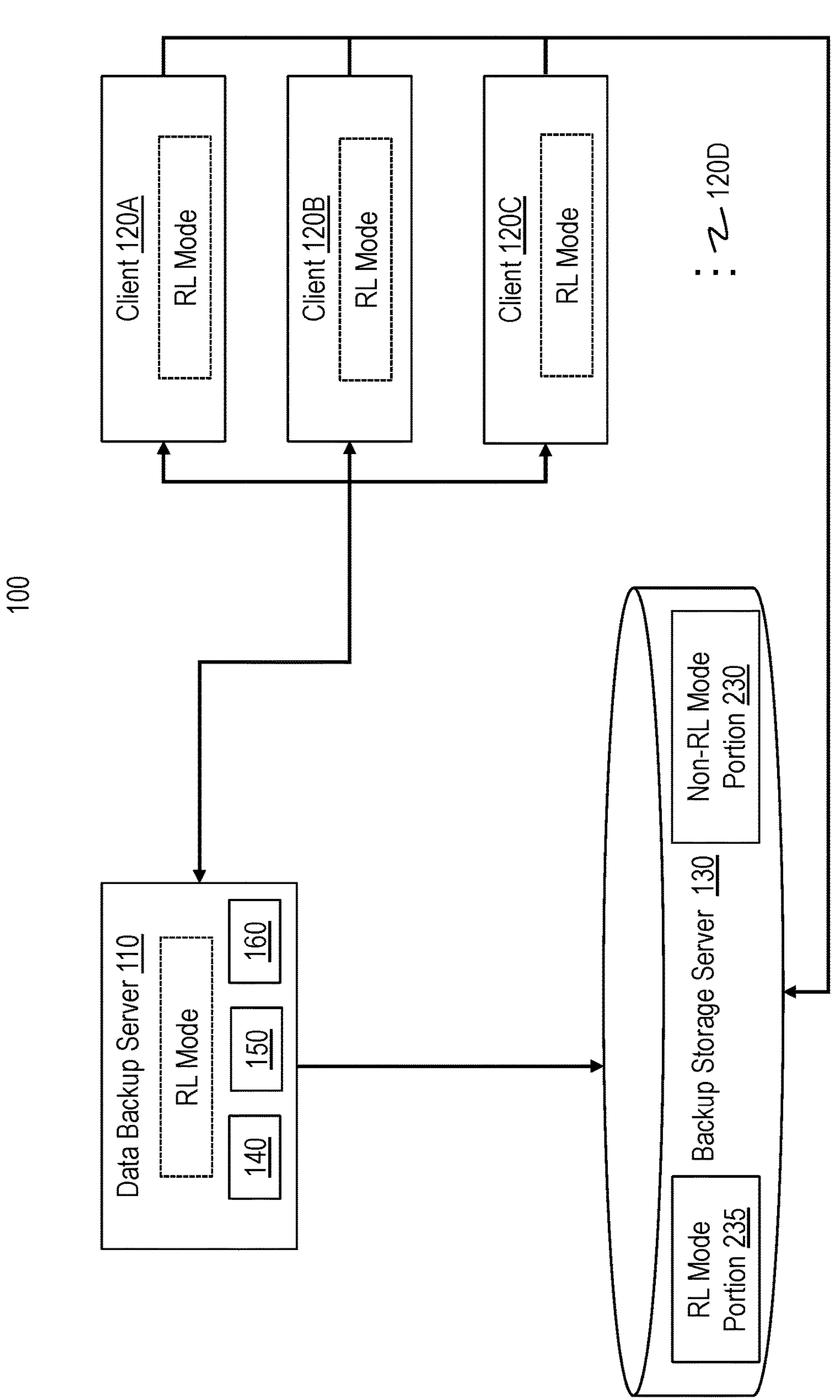
FIG. 2 illustrates an alternative view of the embodiment of backup computing system of FIG. 1.

FIG. 2 illustrates a simplified view of the backup computing system 100. As illustrated in FIG. 2, the data backup server 110 controls a client 120A, a client 120B, a client 120C and any number of additional clients 120D as illustrated by the ellipses. The clients 120A-120D may be configured in the manner described for client 120 in FIG. 1. FIG. 2 also illustrates the backup storage server 130.

Although the backup computing system 100 works well for providing backup services, in recent years, there has been a growing need for the backup computing system 100 to operate in a Retention Lock (RL) mode. RL mode means that any backup data that has the RL functionality applied to it cannot be modified, altered, or deleted until such time as the retention lock expires. Accordingly, the use of the RL mode is a way to ensure that backup data will not be changed or lost in any way until the expiration of the RL mode. This can be desirable for users who have needs, such as regulatory needs, to ensure that backup data is retained unchanged for a given period of time.

While the use of RL mode is thus beneficial to users who desire or need the RL mode functionality, it also causes unique problems for some existing backup computing systems 100. One problem is that many existing data backup servers 110 and the associated data backup server agents 170 that are resident on the clients 120A-120D are not configured for operation in RL mode. The backup storage server 130, however, is configured to operate in both a non-RL mode and a RL mode and may have a non-RL mode portion 230 where data files that are not RL compliant are stored and a RL mode portion 235 where data files that are RL compliant are stored. Thus, even if the backup storage server 130 is configured to operate in RL mode, the data backup server 110 and the clients 120A-120D may not be.

One solution to this problem is to upgrade the data backup server 110 to operate in RL mode. Configuring the data backup server 110 to operate in RL mode includes upgrading various software and the like on the data backup server 110. This is represented by the dashed line RL mode label shown in the figure.

In addition, if the data backup server 110 is upgraded to operate in RL mode, then each of the clients 120 must also be upgraded to operate in RL mode since a data backup server 110 that is configured to operate in RL mode cannot control clients 120 that are not configured to operate in RL mode. Configuring the clients 120 to operate in RL mode includes upgrading various software and the like, especially the data backup server agent 170. This is represented by the dashed line RL mode label shown in the figure for client 120A, 120B, and 120C. Although not illustrated, all of the clients 120D would also have to be upgraded. Given the large number of clients 120 that each must be upgraded, a large amount of time and resources are required to perform the upgrade. In some cases, this may require several weeks or months, during which the backup computing system 100 is not available for use.

Thus, the solution of simply upgrading the data backup server 110 and all the clients 120 to operate in RL mode at once may not be feasible for some users. Advantageously, the principles of the current invention provide an alternative solution that allows for the backup computing system 100 to operate in RL mode without the need to upgrade the backup server 110 and the all the clients 120 at the same time as will be explained in further detail.

Figure 3A:
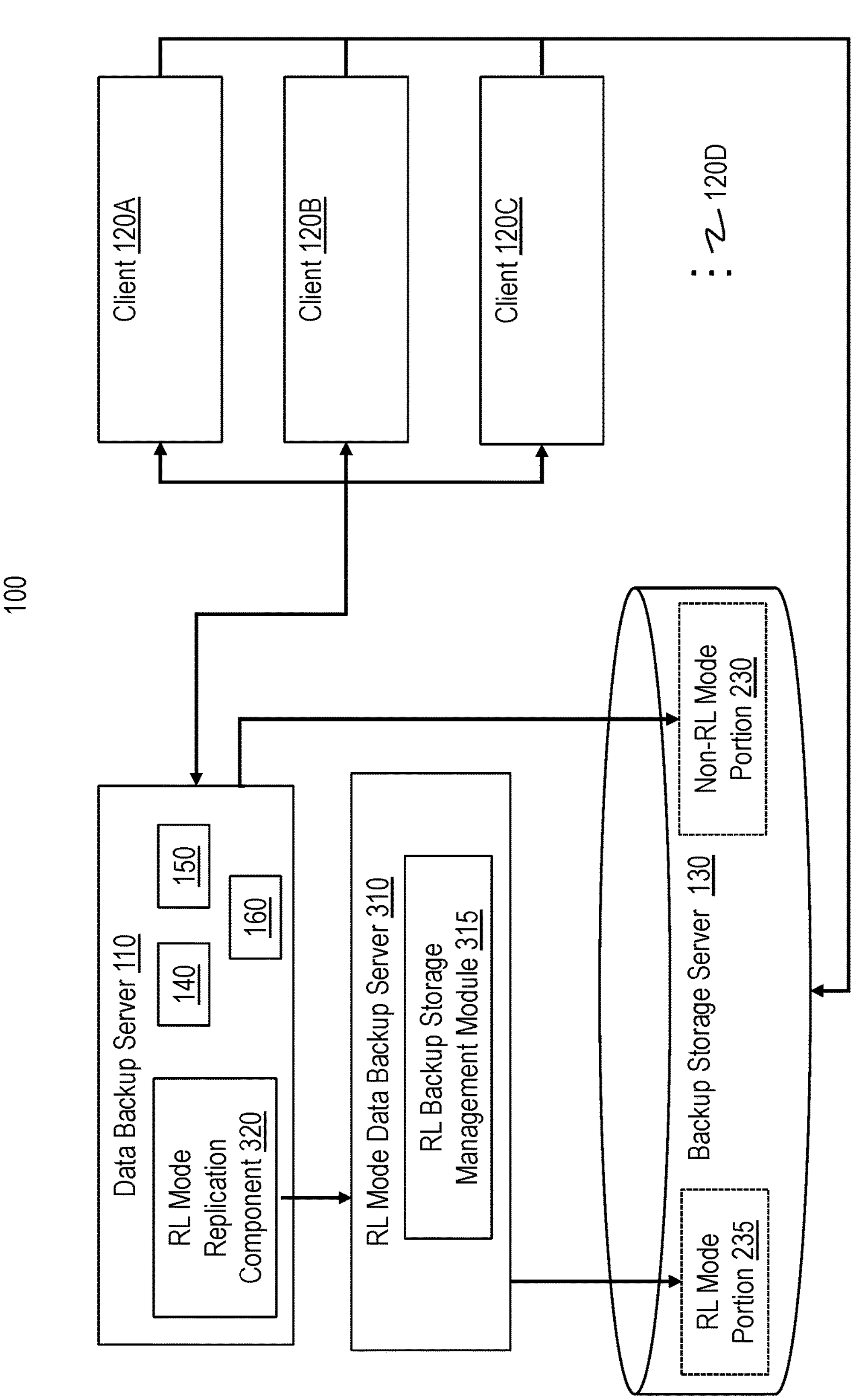
FIGS. 3A and 3B an embodiment of a backup computing system including a backup data server having a RL mode replication component and a backup server operating in RL mode according to embodiments disclosed herein.

FIG. 3A illustrates an embodiment of the backup computing system 100 where the principles of the present invention may be practiced. As illustrated, the embodiment of FIG. 3A includes the data backup server 110 that is not configured to operate in the RL mode and that controls the clients 120A-120D that are also not configured to operate in the RL mode. The backup storage server 130, however, is configured to operate in both the non-RL mode and the RL mode.

In the embodiment of FIG. 3A, an RL mode data backup server 310 is also implemented in addition to the data backup server 110. The RL mode data backup server 310 includes all the software and the like to ensure that the RL mode data backup server 310 is able to fully operate in RL mode. In some embodiments, the RL mode data backup server 310 may also include all the other functionality of the data backup server 110 previously described in relation to FIG. 1. However, since the RL mode data backup server 310 does not control any backup servers like the clients 120, the RL mode data backup server 310 need not be implemented with the full functionality of the data backup server 110. Rather, the RL mode data backup server 310 can be implemented with just the functionality, in addition to the RL mode functionality, needed for it to control data files saved in RL mode as will be explained in more detail to follow. In the illustrated embodiment, the RL mode data backup server 310 includes a RL backup storage management module 315 that allows the RL mode data backup server 310 to provide management services to the RL mode portion 235 portion of the backup storage server 130 and may correspond to the backup storage management module 160 previously described.

Because a non-RL mode data backup server cannot operate with a RL mode compliant data backup server, a change is also made to the data backup server 110. As illustrated, a portion of the data backup server 110 is upgraded to implement an RL mode replication component 320. In operation, the RL mode replication component 320 allows the data backup server 110 to replicate data to the RL mode data backup server 310 as will be explained in more detail to follow. Since the RL mode replication component 320 is only small part of the overall functionality of the data backup server 110, the upgrade to implement the RL mode replication component 320 can be done with little time or processing resource cost to the data backup server 110. In one embodiment, implementing the RL mode replication component requires only one binary replacement to replace an existing replication component of the data backup server 110.

Figure 3B:
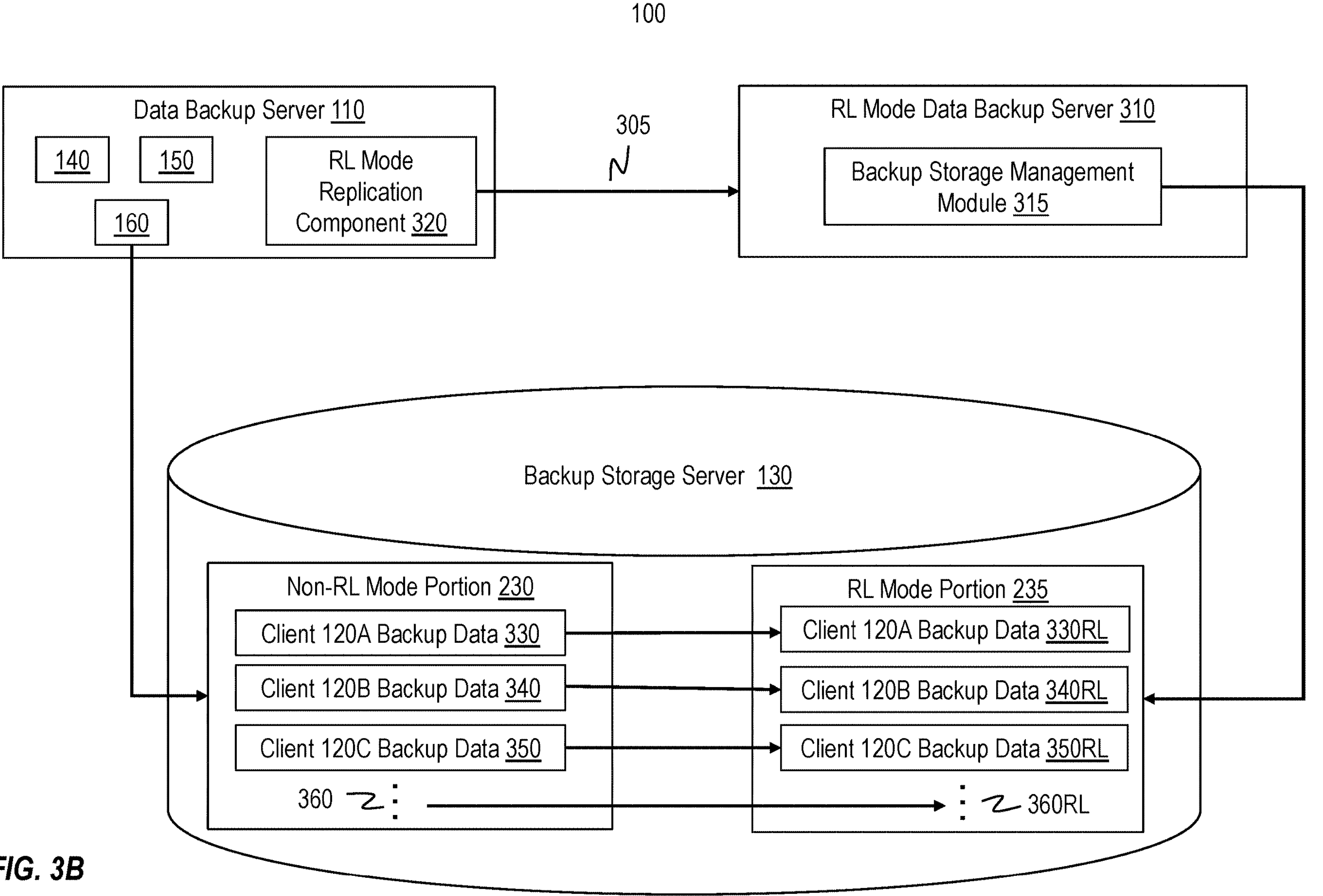

FIG. 3B illustrates the operation of the backup computing system of FIG. 3A. As illustrated, the clients 120 have sent their data files to be stored on the backup storage server 130 in the non-RL mode portion 230 in the manner previously described in relation to FIG. 1 (i.e., the deduped data files 172). Thus, the non-RL mode portion 230 stores client 120A backup data 330, client 120B backup data 340, client 120C backup data 350, and client backup data 360 from any number of the clients 120D as illustrated by the ellipses.

As discussed previously, the data backup server 110 includes the RL mode replication component 320. In operation, the RL mode replication component 320 is able to replicate the client 120A backup data 330, client 120B backup data 340, client 120C backup data 350, client backup data 360 into the RL mode portion 235 of the backup storage server 130 and then retention lock the backup data so that the backup data is retention lock compliant. The retention locked backup data is shown in FIG. 3B as client 120A backup data 330RL, client 120B backup data 340RL, client 120C backup data 350RL, and retention locked client backup data 360RL from any number of clients 120D as illustrated by the ellipses. Since the backup data stays within the same backup storage server 130 and the RL backup data copies dedupe with the non-RL backup data copies, there is no extra cost in terms of storage resources since an actual copy is not sent from the non-RL mode portion 230 to the RL mode portion 235. Rather, the deduped copies May be virtual copies that include pointers to the actual data in the manner known in the art.

As shown at 305, the RL mode replication component 320 then turns over control of the client 120A backup data 330RL, client 120B backup data 340RL, client 120C backup data 350RL, and the client 120D backup data 360RL stored in the RL mode portion 235 over to RL mode data backup server 310. Advantageously, a complete set of the client 120A-120D backup data is now stored in retention lock compliance in the RL mode portion 235 without the need for the user to update any of the clients. Since the data backup server 110 will continue to control the client 120A-120D backup data stored in the non-RL mode portion 230, the user can continue to use the existing clients to backup data as needed. Anytime a backup update is performed, the RL mode replication component 320 can replicate and retention lock the updated backup data in the manner previously described.

In some cases, the user may desire to upgrade all the clients 120 to RL compliance mode at some point. The process described in relation to FIGS. 3A and 3B allows for the user to upgrade each client 120 individually or in small numbers that will not disrupt the backup computing system 100. That is, the user can continue to perform data backups while only taking a small number of clients offline to upgrade at a time. Once all of the clients have been upgraded, the user can upgrade the data backup server 110 to full RL mode compliance and can then discontinue the use of the RL mode data backup server 310 since the data backup server 110 is now fully RL compliant. In such case, all the backup data stored on the backup storage server 130 will be RL compliant.

Figure 4A:
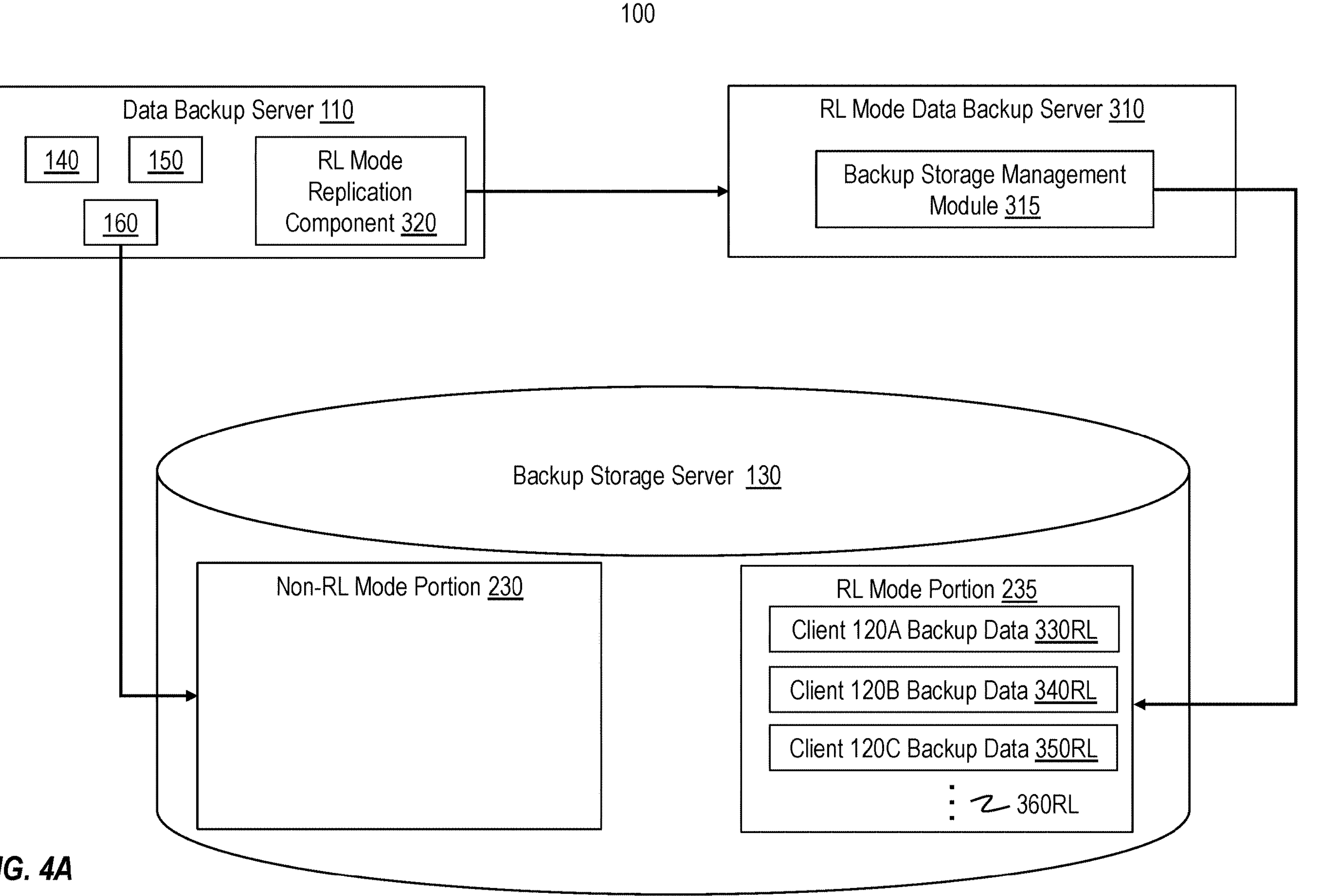
FIGS. 4A and 4B illustrate an embodiment of restoring data in the backup computing system of FIGS. 3A and 3B.
Figure 4B:
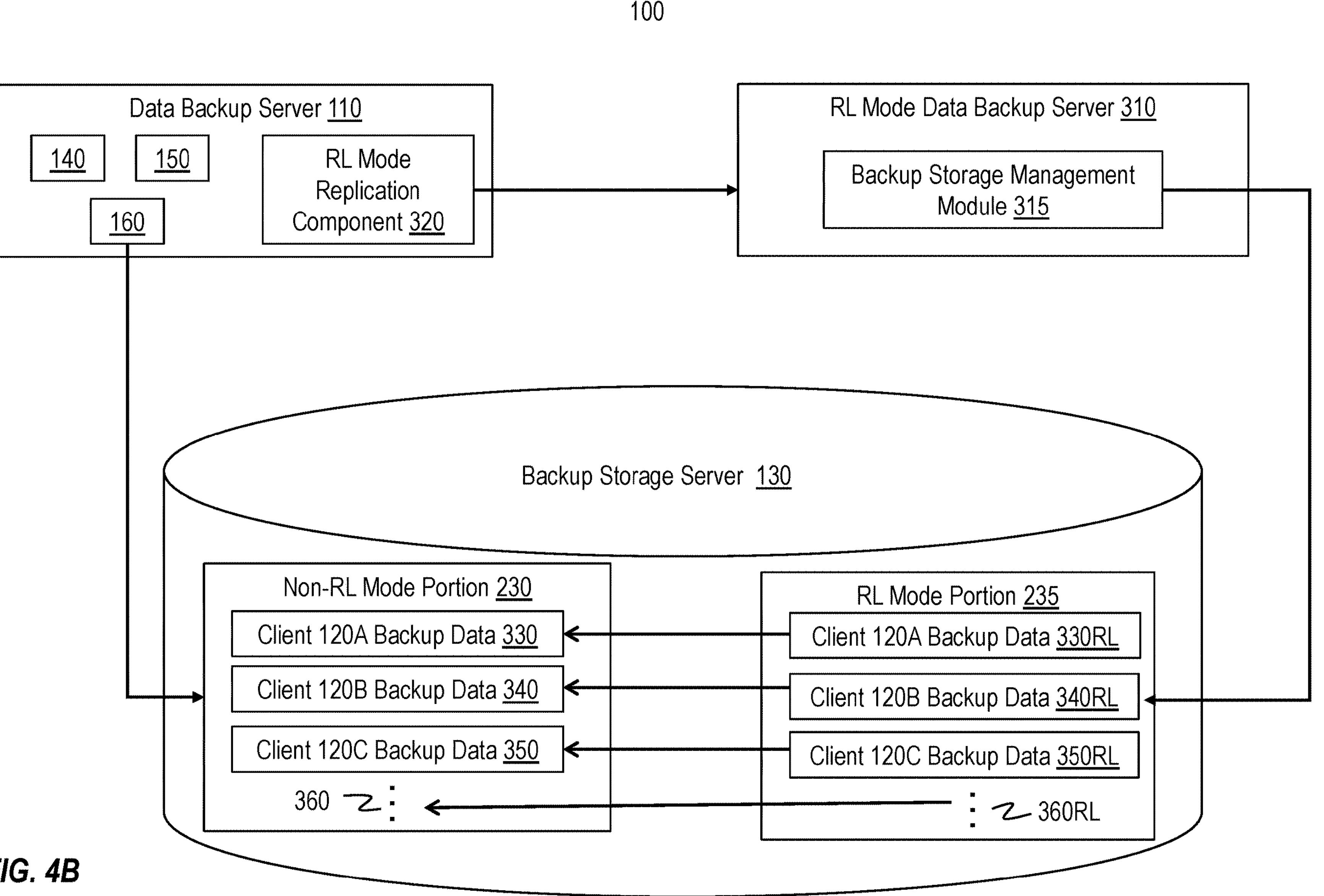

FIGS. 4A and 4B illustrate how the backup computing system 100 of FIGS. 3A and 3B can be used in a backup operation. As shown in FIG. 4A, the client 120A backup data 330, client 120B backup data 340, client 120C backup data 350, and client backup data 360 has been removed or deleted from the non-RL portion 230 of the backup storage server 130. The backup data could have been removed due to malicious reasons such as a hacking attack or due to a user mistake. Since the backup data in the non-RL mode portion 230 is not retention locked, this data is able to be removed or deleted.

As shown in FIG. 4B, the RL data backup server 310 is able to perform a reverse replication operation that will push a deduped copy of the client 120A backup data 330, client 120B backup data 340, client 120C backup data 350, and client backup data 360 back into the non-RL mode portion 230. Since the reverse replication is done using the deduped copy, the restoration of the backup data to the non-RL portion 230 can be done in a matter of seconds and thus the reverse replication is also an example of a virtual copy. Although all of the backup data was shown as being restored to the non-RL portion 230, this need not be the case as only a desired subset of the backup data need be restored as circumstances warrant. Alternatively, the data backup server 110 is able to perform a reverse replication operation that will pull a deduped copy of the client 120A backup data 330, client 120B backup data 340, client 120C backup data 350, and client backup data 360 back into the non-RL mode portion 230.

Figure 5A:
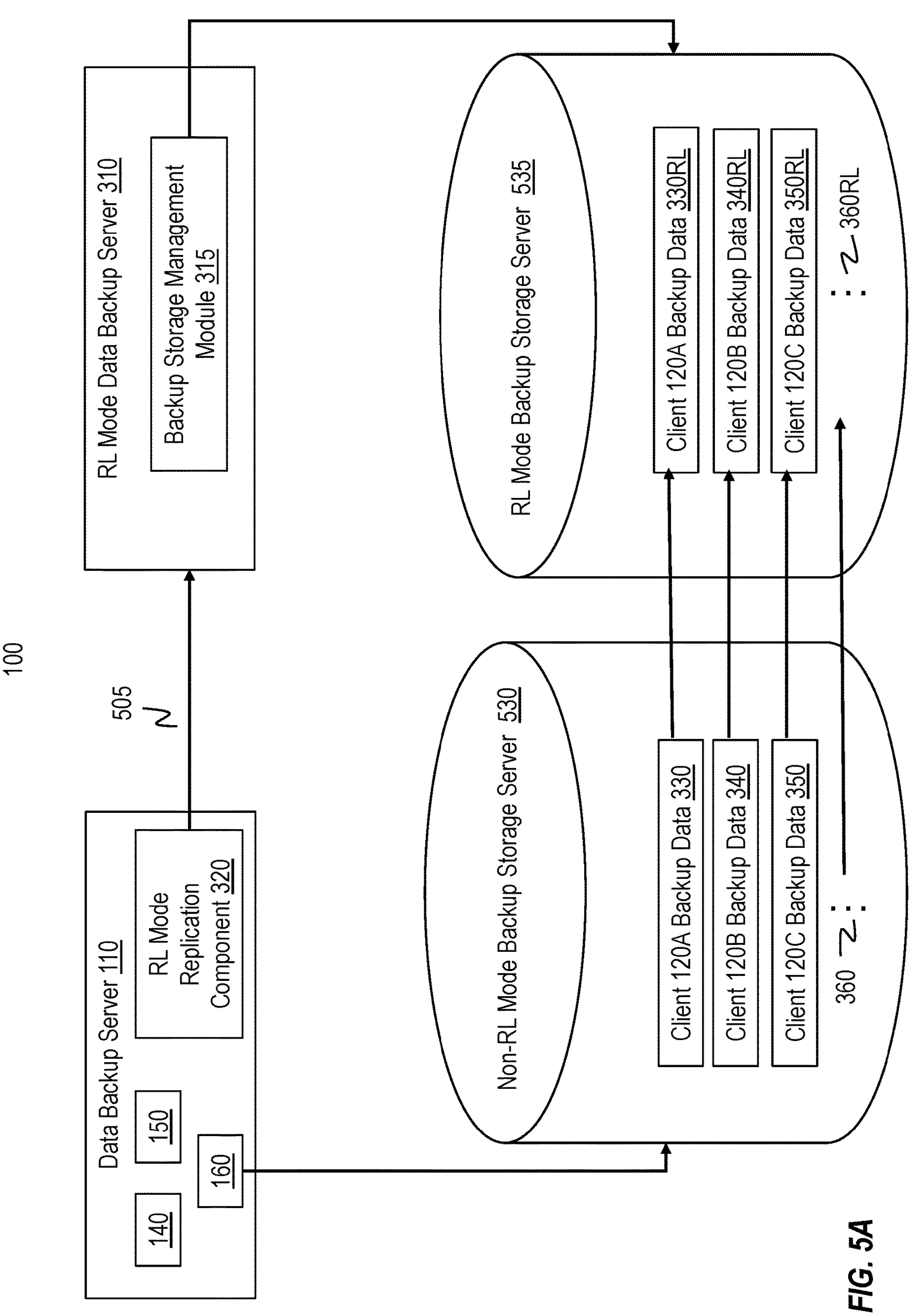
FIGS. 5A and 5B illustrate an alternative embodiment of a backup computing system including a backup data server having a RL mode replication component and a backup server operating in RL mode according to embodiments disclosed herein.
Figure 5B:
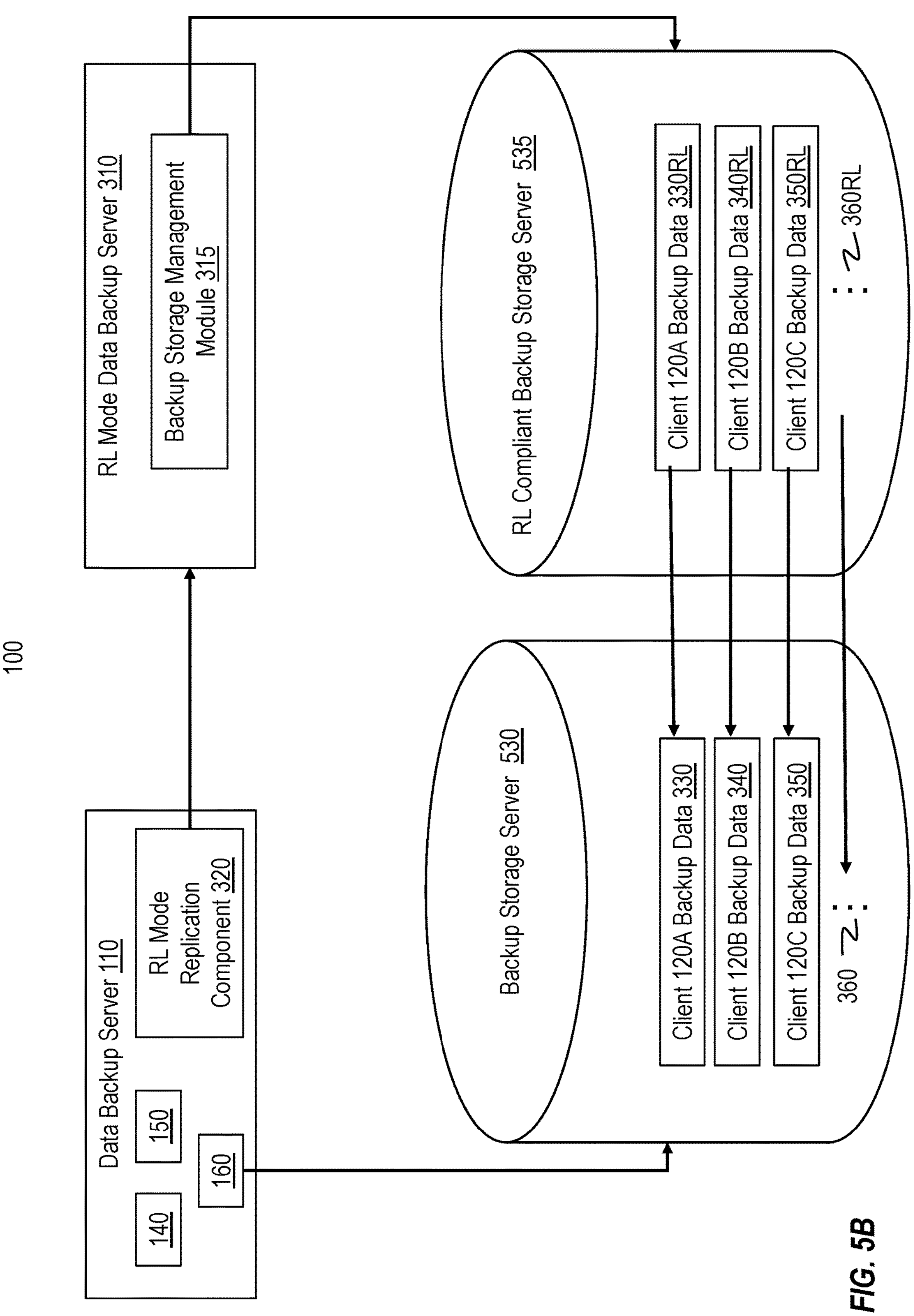

FIGS. 5A and 5B illustrate an alternative embodiment of the backup computing system 100 of FIGS. 3A-3B. As illustrated in FIG. 5A, the backup computing system 100 of this embodiment includes both the data backup server 110 and the RL mode backup server 310. However, in the embodiment of FIG. 5A, there are two backup storage servers, a non-RL mode backup storage server 530 and a RL compliant backup server 535.

As illustrated in FIG. 5A, the clients 120 have sent their data files to be stored on the non-RL mode backup storage server 530 in the manner previously described in relation to FIG. 1 (i.e., the deduped data files 172). Thus, non-RL mode backup storage server 530 stores client 120A backup data 330, client 120B backup data 340, client 120C backup data 350, and client backup data 360 from any number of the clients 120D as illustrated by the ellipses.

As discussed previously, the data backup server 110 includes the RL mode replication component 320. In operation, the RL mode replication component 320 is able to replicate the client 120A backup data 330, client 120B backup data 340, client 120C backup data 350, client backup data 360 into mode backup storage server 535 and then retention lock the backup data so that the backup data is retention lock compliant. The retention locked backup data is shown in FIG. 5A as client 120A backup data 330RL, client 120B backup data 340RL, client 120C backup data 350RL, and retention locked client backup data 360RL from any number of clients 120D as illustrated by the ellipses. Since there are two different backup storage servers implemented in this embodiment, the replication of the backup data into the RL mode backup storage server 535 requires that an actual copy be sent from the non-RL mode backup storage server 530 to the RL mode backup storage server 535. Thus, the embodiment of FIG. 5A will require more resources than the embodiment of FIG. 3B, but will still result in a retention locked copy of the backup data being saved in the RL mode backup storage server 535.

As shown at 505, the RL mode replication component 320 then turns over control of the client 120A backup data 330RL, client 120B backup data 340RL, client 120C backup data 350RL, and the client 120D backup data 360RL stored in the RL mode backup storage server 535. As with the embodiment of FIG. 3B, a complete set of the client 120A-120D backup data is now stored in retention lock compliance in the RL mode backup storage server 535 without the need for the user to update any of the clients. Since the data backup server 110 will continue to control the client 120A-120D backup data stored in the non-RL mode backup storage server 530, the user can continue to use the existing clients to backup data as needed. Anytime a backup update is performed, the RL mode replication component 320 can replicate and retention lock the updated backup data in the RL mode backup storage server 535.

FIG. 5B illustrates that the RL data backup server 310 is able to perform a reverse replication operation that will pull a copy of the client 120A backup data 330, client 120B backup data 340, client 120C backup data 350, and client backup data 360 back into the non-RL mode backup storage server 530 in cases where one or more of the backup data files have been removed from the non-RL mode backup storage server 530. Since there are two different backup storage servers implemented in this embodiment, the restoration of the backup data into the non-RL mode backup storage server 530 requires that an actual copy be sent from the RL mode backup storage server 535 to the non-RL mode backup storage server 530. Thus, the embodiment of FIG. 5B will require more resources than the embodiment of FIG. 4B, but will still result in the restoration of the backup data into the non-RL mode backup storage server 530.

C. Example Methods

Figure 6:
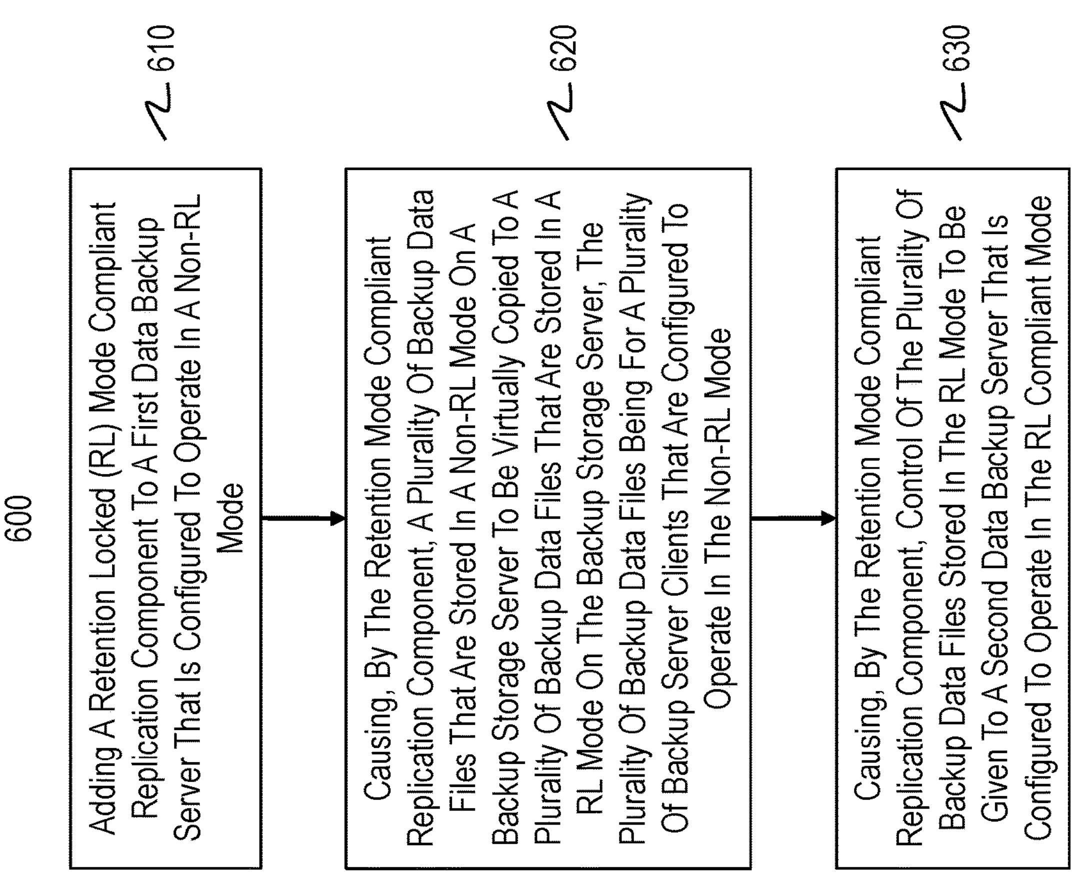
FIG. 6 illustrates a flowchart of an example method for causing backup data to be stored in a retention locked mode using a backup data server that operates in a non-retention locked mode.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 for causing backup data to be stored in a retention locked mode using a backup data server that operates in a non-retention locked mode is disclosed. The method 600 will be described in relation to one or more of the figures previously described, although the method 600 is not limited to any particular embodiment.

The method 600 includes adding a retention locked (RL) mode compliant replication component to a first data backup server that is configured to operate in a non-RL mode (610). For example, as previously described the RL mode replication component 320 may be added to the data backup server 110 that is configured to operate in the non-RL mode.

The method 600 includes causing, by the retention locked mode compliant replication component, a plurality of backup data files that are stored in a non-RL mode on a backup storage server to be virtually copied to a plurality of backup data files that are stored in a RL mode on the backup storage server, the plurality of backup data files being for a plurality of backup server clients that are configured to operate in the non-RL mode (620). For example, as previously described the RL mode replication component 320 causes the client 120A backup data 330, client 120B backup data 340, client 120C backup data 350, and client backup data 360 to be replicated into the client 120A backup data 330RL, client 120B backup data 340RL, client 120C backup data 350RL, and client backup data 360RL that is retention locked. The client backup data are backup data files for the clients 120A-120D. In some embodiments the client 120A backup data 330, client 120B backup data 340, client 120C backup data 350, client backup data 360 is stored in the non-RL mode portion 230 of the backup storage server 130 and the client 120A backup data 330RL, client 120B backup data 340RL, client 120C backup data 350RL, and client backup data 360RL is stored in the RL mode portion 235 of the backup storage server 130. In other embodiments, the client 120A backup data 330, client 120B backup data 340, client 120C backup data 350, client backup data 360 is stored in the non-RL mode backup storage server 530 and the client 120A backup data 330RL, client 120B backup data 340RL, client 120C backup data 350RL, and client backup data 360RL is stored in the RL mode backup storage server 535.

The method 600 includes causing, by the retention locked mode compliant replication component, control of the plurality of backup data files stored in the RL mode to be given to a second data backup server that is configured to operate in the RL compliant mode (630). For example, as previously described the RL mode replication component 320 gives control of the client 120A backup data 330RL, client 120B backup data 340RL, client 120C backup data 350RL, and client backup data 360RL to the RL mode data backup server 310.

D. Further Example Embodiments

Following are some further example embodiments of the invention. These are presented only by way of example and are not intended to limit the scope of the invention in any way.

Embodiment 1. A method, comprising: adding a retention locked (RL) mode compliant replication component to a first data backup server that is configured to operate in a non-RL mode; causing, by the retention locked mode compliant replication component, a plurality of backup data files that are stored in a non-RL mode on a backup storage server to be virtually copied to a plurality of backup data files that are stored in a RL mode on the backup storage server, the plurality of backup data files being for a plurality of backup server clients that are configured to operate in the non-RL mode; and causing, by the retention locked mode compliant replication component, control of the plurality of backup data files stored in the RL mode to be given to a second data backup server that is configured to operate in the RL compliant mode.

Embodiment 2. The method of embodiment 1, wherein the backup storage server includes a non-RL mode portion where the plurality of backup data files in the non-RL mode are stored and includes a RL mode portion where the plurality of backup data files in the RL mode are stored.

Embodiment 3. The method of embodiments 1-2, wherein the backup storage is a first non-RL mode compliant backup server where the plurality of backup data files in the non-RL mode are stored and a second RL mode compliant backup server where the plurality of backup data files in the RL mode are stored.

Embodiment 4. The method of embodiments 1-3, wherein the plurality of backup data files in the RL mode are prevented from being altered or removed from the backup storage server.

Embodiment 5. The method of embodiments 1-4, wherein the second data backup server that is configured to operate in the RL compliant mode includes all the functionality of the first data backup server that is configured to operate in the non-RL mode.

Embodiment 6. The method of embodiments 1-5, wherein the second data backup server that is configured to operate in the RL compliant mode includes only a subset of the functionality of the first data backup server that is configured to operate in the non-RL mode.

Embodiment 7. The method of embodiments 1-6, further comprising: using the plurality of backup data files in the RL mode to restore the plurality of backup data files in the non-RL mode.

Embodiment 8. A system, comprising hardware and/or software, operable to perform any of the operations, methods, or processes, or any portion of any of these, disclosed herein.

Embodiment 9. A non-transitory storage medium having stored therein instructions that are executable by one or more hardware processors to perform operations comprising the operations of any one or more of embodiments 1-7.

E. Example Computing Devices and Associated Media

Finally, because the principles described herein may be performed in the context of a computing system some introductory discussion of a computing system will be described with respect to FIG. 7. Computing systems are now increasingly taking on a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
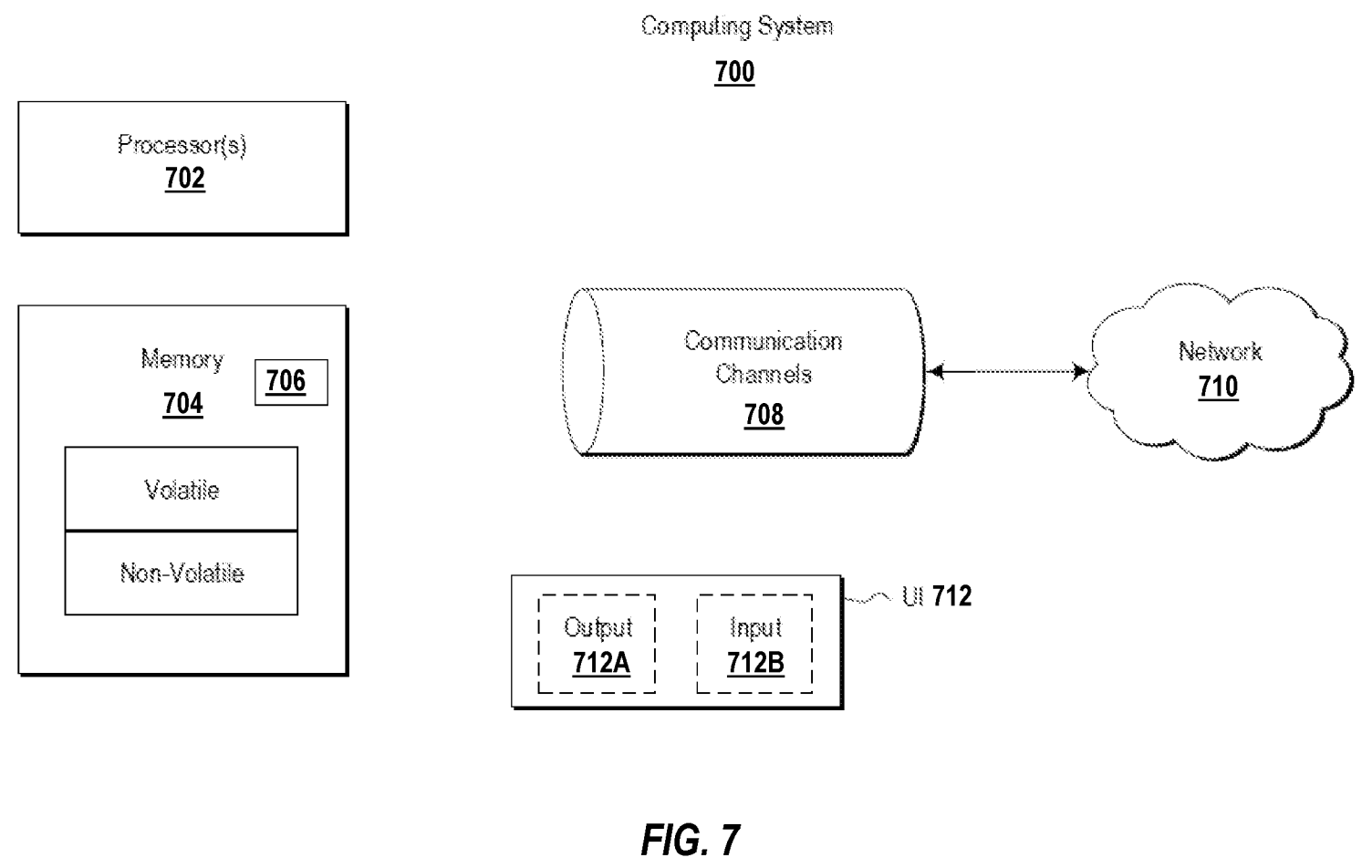

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing orders. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

installing a retention locked (RL) mode compliant replication component to a first data backup server that is configured to operate in a non-RL mode, the retention locked mode compliant replication component comprising computer executable instructions executed by one or more processors of the first data backup server;

causing, by the retention locked mode compliant replication component, a plurality of backup data files that are stored in the non-RL mode on a backup storage server in a non-RL mode portion of the backup storage server to be virtually copied as deduplicated logical copies having pointers to underlying data without physically duplicating the underlying data, the virtual copying being performed within the backup storage server from the non-RL mode portion to an RL mode portion to create a plurality of backup data files that are stored in an RL mode on the backup storage server, the plurality of backup data files being for a plurality of backup server clients that are configured to operate in the non-RL mode; and causing, by the retention locked mode compliant replication component, management control of the plurality of backup data files stored in the RL mode on the backup storage server to be given to a second data backup server that is configured to operate in the RL mode, wherein the second data backup server maintains retention-lock access restrictions and corresponding metadata and deduplication references for the underlying data associated with the RL-mode backup data files, such that the underlying data remain stored and immutable in the non RL backup files as long as the retention lock has not expired, and wherein the second data backup server is further configured to reconstruct the non-RL backup data files from the deduplicated underlying data subject to a retention lock when restoration of the non-RL backup data files is required.

2. The method of claim 1, wherein the backup storage server includes a non-RL mode portion where the plurality of backup data files in the non-RL mode are stored and includes a RL mode portion where the plurality of backup data files in the RL mode are stored.

3. The method of claim 1, wherein the virtual copies are deduped copies having a pointer to underlying data.

4. The method of claim 1, wherein the plurality of backup data files in the RL mode are prevented from being altered or removed from the backup storage server.

5. The method of claim 1, further comprising:

using the plurality of backup data files in the RL mode to restore the plurality of backup data files in the non-RL mode.

6. A non-transitory storage medium having stored therein instructions that are executable by one or more hardware processors to perform operations comprising:

installing a retention locked (RL) mode compliant replication component to a first data backup server that is configured to operate in a non-RL mode, the retention locked mode compliant replication component comprising computer executable instructions executed by one or more processors of the first data backup server;

causing, by the retention locked mode compliant replication component, a plurality of backup data files that are stored in the non-RL mode on a backup storage server in a non-RL mode portion of the backup storage server to be virtually copied as deduplicated logical copies having pointers to underlying data without physically duplicating the underlying data, the virtual copying being performed within the backup storage server from the non-RL mode portion to an RL mode portion to create a plurality of backup data files that are stored in an RL mode on the backup storage server, the plurality of backup data files being for a plurality of backup server clients that are configured to operate in the non-RL mode; and causing, by the retention locked mode compliant replication component, management control of the plurality of backup data files stored in the RL mode on the backup storage server to be given to a second data backup server that is configured to operate in the RL mode, wherein the second data backup server maintains retention-lock access restrictions and corresponding metadata and deduplication references for the underlying data associated with the RL-mode backup data files, such that the underlying data remain stored and immutable in the non RL backup files as long as the retention lock has not expired, and wherein the second data backup server is further configured to reconstruct the non-RL backup data files from the deduplicated underlying data subject to a retention lock when restoration of the non-RL backup data files is required.

7. The non-transitory storage medium of claim 6, wherein the backup storage server includes a non-RL mode portion where the plurality of backup data files in the non-RL mode are stored and includes a RL mode portion where the plurality of backup data files in the RL mode are stored.

8. The non-transitory storage medium of claim 6, wherein the virtual copies are deduped copies having a pointer to underlying data.

9. The non-transitory storage medium of claim 6, wherein the plurality of backup data files in the RL mode are prevented from being altered or removed from the backup storage server.

10. The non-transitory storage medium of claim 6, further comprising:

using the plurality of backup data files in the RL mode to restore the plurality of backup data files in the non-RL mode.

11. A computing system comprising:

one or more processors;

a non-transitory storage medium having stored therein instructions that, when executed by the one or more processors, cause the computing system to perform the following:

install a retention locked (RL) mode compliant replication component to a first data backup server that is configured to operate in a non-RL mode, the retention locked mode compliant replication component comprising computer executable instructions executed by one or more processors of the first data backup server;

cause by the retention locked mode compliant replication component a plurality of backup data files that are stored in the non-RL mode on a backup storage server in a non-RL mode portion of the backup storage server to be virtually copied as deduplicated logical copies that reference underlying data without physically duplicating the underlying data, the virtual copying being performed within the backup storage server from the non-RL mode portion to an RL mode portion to create a plurality of backup data files that are stored in an RL mode on the backup storage server, the plurality of backup data files being for a plurality of backup server clients that are configured to operate in the non-RL mode; and cause, by the retention locked mode compliant replication component, management control of the plurality of backup data files stored in the RL mode on the backup storage server to be given to a second data backup server that is configured to operate in the RL mode wherein the second data backup server maintains retention-lock access restrictions and corresponding metadata and deduplication references for the underlying data associated with the RL-mode backup data files, such that the underlying data remain stored and immutable, and wherein the second data backup server is further configured to reconstruct the non-RL backup data files from the deduplicated underlying data subject to a retention lock when restoration of the non-RL backup data files is required.

12. The computing system of claim 11, wherein the backup storage server includes a non-RL mode portion where the plurality of backup data files in the non-RL mode are stored and includes a RL mode portion where the plurality of backup data files in the RL mode are stored.

13. The computing system of claim 11, wherein the virtual copies are deduped copies having a pointer to underlying data.

14. The computing system of claim 11, wherein the plurality of backup data files in the RL mode are prevented from being altered or removed from the backup storage server.

15. The computing system of claim 11, further comprising:

using the plurality of backup data files in the RL mode to restore the plurality of backup data files in the non-RL mode.

* * * * *